Feb. 8, 1949.                    B. E. LUBOSHEZ                    2,461,166
                    INSTRUMENT FOR TESTING THE ACCURACY OF
                    THE ANGLE BETWEEN TWO PRISM FACES
Filed May 2, 1945                                         3 Sheets-Sheet 1
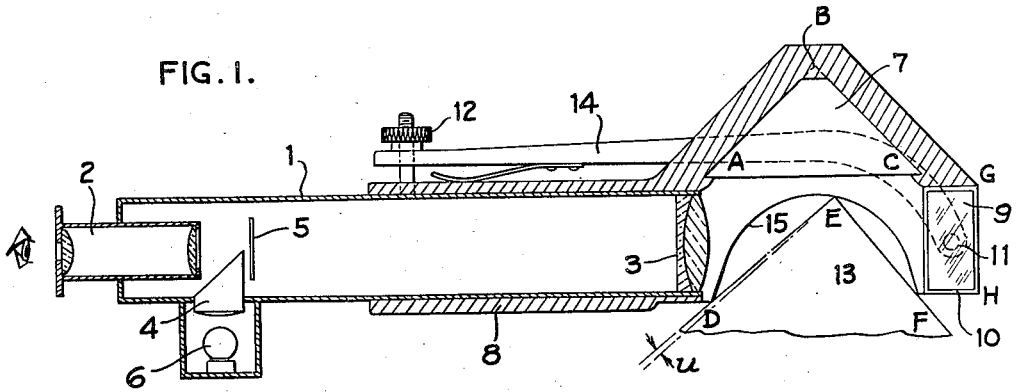
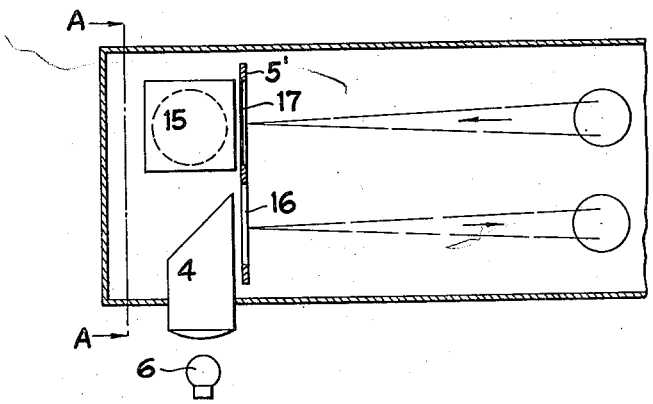
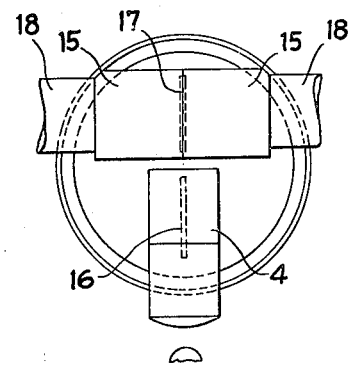
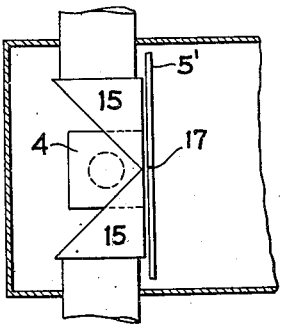
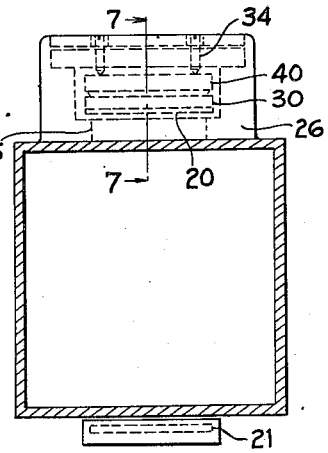
BENJAMIN E. LUBOSHEZ
    INVENTOR
BY *Newton M. Perrins*
    ATTORNEYS Feb. 8, 1949.    B. E. LUBOSHEZ    2,461,166
INSTRUMENT FOR TESTING THE ACCURACY OF
THE ANGLE BETWEEN TWO PRISM FACES
Filed May 2, 1945    3 Sheets-Sheet 2
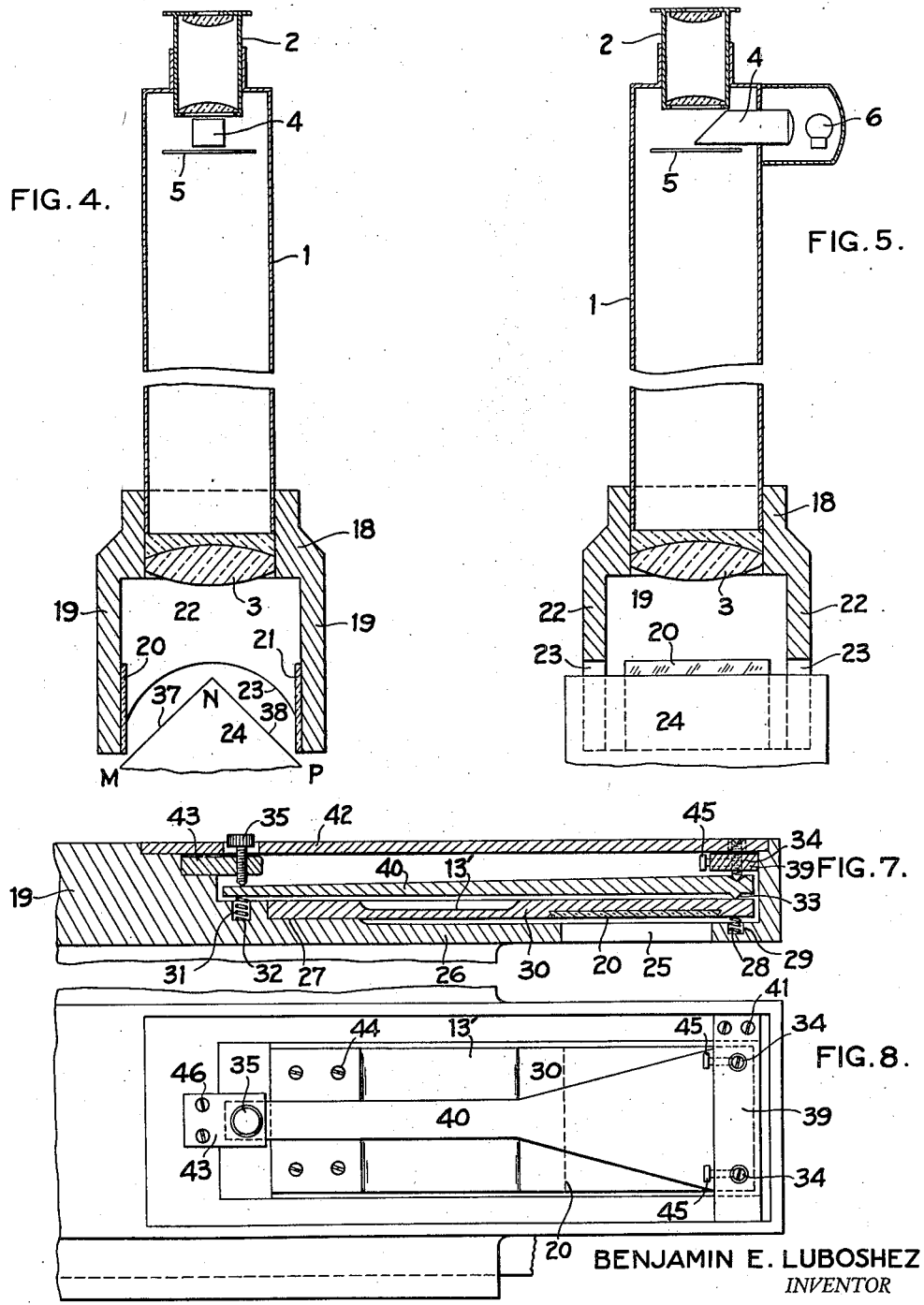
BENJAMIN E. LUBOSHEZ
INVENTOR
BY Newton M Perkins
ATTORNEYS Feb. 8, 1949.  B. E. LUBOSHEZ  2,461,166
INSTRUMENT FOR TESTING THE ACCURACY OF
THE ANGLE BETWEEN TWO PRISM FACES
Filed May 2, 1945  3 Sheets-Sheet 3

BENJAMIN E. LUBOSHEZ
*INVENTOR*

BY *Newton M. Perrins*

*ATTORNEYS*

Patented Feb. 8, 1949

2,461,166

UNITED STATES PATENT OFFICE 2,461,166

INSTRUMENT FOR TESTING THE ACCURACY OF THE ANGLE BETWEEN TWO PRISM FACES

Benjamin E. Luboshez, Rochester, N. Y., assignor to Eastman Kodak Company, Rochester, N. Y., a corporation of New Jersey Application May 2, 1945, Serial No. 591,502

3 Claims. (Cl. 88—14)

This invention relates to testing instruments and more particularly to apparatus for determining optically whether or not a plane surface is correctly positioned in regard to another and whether a prism has truly perpendicular surfaces or the like.

The system comprises a Gauss eyepiece; that is, an eyepiece in which the user views an illuminated reticle, and reflecting surfaces including the surface or surfaces to be tested, the image or images of the reticle being reflected through the system back to the plane of the reticle where the position or positions of the reflected reticle marks, with respect to the original marks or to each other, show how close the surfaces under inspection are to the desired relation.

Reference will now be made to the accompanying drawings wherein like reference characters designate like parts and several embodiments of my invention are disclosed.

Figure 1 shows diagrammatically and in section one embodiment of my invention.

Figures 2 and 3 are diagrammatic, fragmentary views, at right angles one to the other, of a modified portion of the apparatus of Figure 1.

Figure 2A is a section on line A—A of Fig. 2.

Figures 4 and 5 are diagrammatic views, at right angles one to the other, partly in section, of another embodiment of my invention.

Figure 6 is a view looking from the bottom end of Figures 4 and 5 showing in greater detail the mounting of mirror 20.

Figure 7 is a sectional view along the line 7—7 of Fig. 6.

Figure 8 is a view looking from the top of Fig. 7, the plate being removed.

Figure 9:
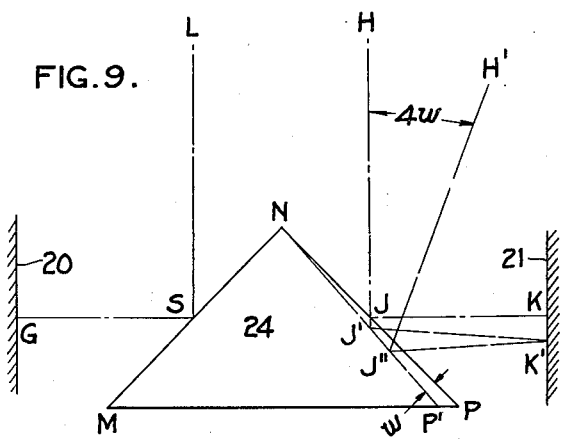

Figures 9 to 13 inclusive are diagrams used to explain the operation of the form shown in Figures 4 and 5.

Referring to Figure 1, I represents a collimating telescope with the eyepiece 2, objective lens 3, and a reticle 5, half of which is illuminated by the lamp 6 the light from which is reflected by the prism 4 which also transmits light between the eyepiece 2 and lens 3. The telescope assembly is held in a rigid mount 8 having an extension within which is fixedly mounted the roof prism 7, the totally reflecting walls AB and BC of which are accurately at a right angle to one another.

A small roof prism 9 with its roof edge GH in the plane of the paper is mounted upon an assembly 10 to rotate about an axis 11 to which is attached an arm 14 the end of which may be adjusted by the micrometer screw adjustment 12.

The light from lamp 6 illuminates one half the reticle 5 the rays from the lines of which are collimated by lens 3, that is, rendered parallel, and are reflected directly back by the roof prism 9 upon the other half of the reticle when a prism is not being tested. If the instrument is correctly adjusted, the original and reflected lines will be in registration. If the entire reticle is illuminated and the lines are symmetrical, the lines will coincide, or they may be purposely out of registration so that the original and reflected lines form a pattern.

The knob 12 may be turned to bring the lines into the desired relation for the zero adjustment.

A prism 13 to be tested is then positioned with its roof line, indicated at E, perpendicular to the plane of the paper. The cut-outs 15 in the walls of the instrument constitute seats against which the prism 13 may be positioned. If both prisms 7 and 13 are truly right angled, the insertion of prism 13 will not affect the position of the reflected image. The light from the reticle will be reflected by surfaces DE, AB, BC, and EF to one inclined surface of the roof mirror 9, then to the other surface and back by a similar path to the reticle.

If, however, the angle DEF should differ from 90° by an angle $u$, the reflected ray will deviate from the zero position by $4u$.

The roof prism 9 may be replaced by a plane mirror.

In Figures 2, 2A, and 3 is shown a modification wherein the eyepiece is omitted and a photoelectric detector substituted, the apparatus being otherwise the same. The reticle 5' is divided, one half comprising an opaque mask having an illuminated slit 16 in front of the reflecting prism 4, and the other half being transparent with an opaque strip 17 in registry with slit 16. Behind the second half are two small reflecting prisms 15 directing light to two photo-electric cells 18, shown fragmentarily. When the apparatus is at the zero adjustment, the image of the slit 16 will fall on the strip 17. If the image falls to one or the other side of the strip, it will affect one or the other of the cells 18 to give indications as to the direction and extent of the deviation.

Another embodiment of my invention is shown in Figures 4 and 5 which are fragmentary and a portion in greater detail in Figs. 6, 7, and 8. This comprises a telescope tube 1, eyepiece 2, objective lens 3, reflecting prism 4, reticle 5, and lamp 6, as in the first embodiment.

Fitted on the objective end of the telescope is a mount 18 having a square, box-like extension with two opposite side walls 19 which carry mirrors 20 and 21 facing one another, the other walls 22 being cut away at 23 to permit the positioning of a prism 24 to be tested. The mirror 20 is preferably adjustable, the details of an adjusting device being shown in Figs. 6, 7, and 8.

One of the side walls 19 has a hollow end and has an opening 25 in the inside wall 26 of the side wall. Directly within the opening is the mirror 20 carried by a flat bar 30. This bar 30 is attached at one end by screws 44 to the front 27 of the wall 26, while the other end rests on a coil spring 28 in recess 29 of wall 26. Bar 30 is reduced at 13' to give it added flexibility. A second bar 40 rests at one end on coiled spring 31 in recess 32 in wall 26, and the other end carries a slight ridge 33 resting on bar 30 just above spring 28. Two adjustable set screws 34 whose ends fit into depressions in bar 40 just above ridge 33 provide coarse adjustment for the angle of mirror 20. The bar 30 can be moved up or down or slightly twisted by adjustment of these screws as required.

An additional screw 35 is adjustable in plate 43, secured by screws 46 to wall 19 and bears against the bar 40 just above spring 31 and permits fine adjustment by raising or depressing the end of the bar, thus rotating it about the points of screws 34 as fulcra and sliding the ridge 33 along the upper surface of bar 30. By suitably proportioning the parts, almost any desired delicacy of adjustment can be obtained. Screws 34 may be held in adjusted position by set screws 45, the screws 34 and 45 being seated in bar 39 which in turn is secured to the wall 19 by screws 41. A cover plate 42 protects the adjusting device when it is adjusted.

The fine adjustment is used for tilting the mirror about an axis perpendicular to the axis of the telescope, while the coarse adjustment can be used for tilting about axes either perpendicular or parallel to the axis. When the mirrors have been set accurately parallel to each other and to the axis of the telescope, the prism 24 to be tested is positioned between them. It is understood that in both forms the prism may be on a work support or may be part of an instrument and that the testing apparatus is a portable tool that may be held in the hand as it is positioned over the prism, or some provision may be made for its stable support.

Part of the light from the reticle 5, after being collimated by objective 3, is reflected from surface 37 of the prism to mirror 20 and then back to form an image in the plane of the reticle, while another part is reflected from surface 38 to mirror 21 and back to the reticle. The displacement between the two reflected images gives a measure of the amount by which the angle of the prism differs from a right angle.

These instruments are simple and convenient to use in the workshop and can be brought to the prism to be tested and a reading obtained instantly without delicate adjustment or positioning. An important feature lies in the fact that their readings are not affected by movement between the test prism and the instrument and lack of symmetry in their relative positions. In the form shown in Fig. 1 this is true as to two axes mutually at right angles and to a first order is true as to the third. In the form shown in Figs. 4 to 6 it is true as to all three axes mutually at right angles, as will be pointed out. In Fig. 9 it is assumed that the prism 24, having the faces MN and NP, is located with the edge N at a right angle to the axis of the collimator and also parallel to the planes of the mirrors 20 and 21. If the angle MNP is a perfect right angle, the paths of two parallel rays will be LSG and HJK, respectively, the rays returning upon themselves and forming a single image in the object plane. If, however, the angle MNP is less than a right angle by the angle $w(PNP')$, the path of ray HJ will be HJ'K'J''H', the angle between HJ and H'J'' being $4w$, and if the magnification of the telescope is $M$, the observed angular deviation will be $4Mw$.

Figure 10:
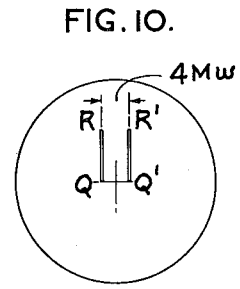
Figure 11:
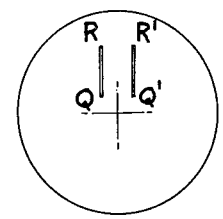
Figure 12:
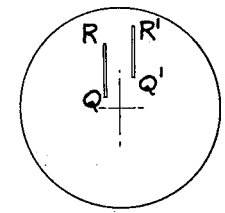
Figure 13:
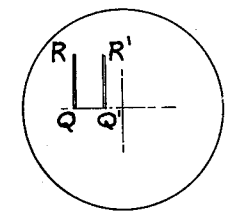

If the reticle is in the form of a narrow illuminated slit RQ, Fig. 10, its image would be reflected back upon itself in the case of a perfect right angle, whereas any departure from a right angle would cause the image R'Q' to be separated from the slit RQ by a distance $4Mw$. Figs. 11, 12, and 13 show the relative positions of the slit and its image if the prism is tilted respectively about an axis MP in the plane of the paper; about an axis parallel to the axis of the collimator; and about an axis parallel to the edge N. In each case the distance between the slit and its image is the same. It is thus apparent that the prism need not be carefully positioned.

A further important feature of the preferred forms of these instruments lies in the fact that since only reflections from the external surfaces of the test prism are utilized, prisms of complex form may be tested as well as partially unfinished prisms which could not be tested by internal reflections.

Having thus described my invention, what I claim is:

1. Apparatus for testing the accuracy of the right angle of a prism having two surfaces at right angles, comprising an eyepiece, a reticle in the focus plane of the eyepiece, means for illuminating the reticle, an objective optically at its focal length from the reticle in optical alignment with the eyepiece and reticle, for receiving light from the reticle and for collimating it, a mount for the eyepiece, reticle and objective having an open portion in front of the objective for receiving the prism to be tested with the two surfaces in the collimated beam of light from the objective, and two plane mirrors carried by said mounts precisely parallel to one another and substantially parallel to the optic axis of the objective, on opposite sides of said open portion, each mirror to receive light from one of the prism surfaces and to reflect it back to that surface and thence through the objective into focus in the reticle plane.

2. Apparatus for testing the accuracy of the right angle of a prism having two surfaces at right angles, comprising an eyepiece, a reticle in the focus plane of the eyepiece, means for illuminating the reticle, an objective optically at its focal length from the reticle in optical alignment with the eyepiece and reticle, for receiving light from the reticle and for collimating it, a mount for the eyepiece, reticle and objective having an open portion in front of the objective for receiving the prism to be tested with the two surfaces in the collimated beam of light from the objective, and a plurality of reflecting surfaces carried by the mount precisely oriented relative to one another for receiving the collimated light reflected by the surfaces of prism when in said open portion and for reflecting it back to the surfaces of the prism and thence back through the objective into focus in the reticle plane.

3. Apparatus for testing the accuracy of the right angle of a prism having two surfaces at right angles, comprising an eyepiece, a reticle in the focus plane of the eyepiece, means for illuminating the reticle, an objective optically at its focal length from the reticle in optical alignment with the eyepiece and reticle, for receiving light from the reticle and for collimating it, a mount for the eyepiece, reticle and objective having an open portion in front of the objective for receiving the prism to be tested with the two surfaces in the collimated beam of light from the objective, a Porro prism carried by the mount at one side of said open portion for receiving the beam reflected by one of the prism surfaces and for directing it to the other, and a roof prism also carried by the mount, with its roof edge perpendicular to the optic axis of the objective at the end of said open portion for receiving the beam reflected from said other surface of the prism and for reflecting it back to that other surface, thence via the Porro prism to said one of the prism surfaces and thence to the objective and into focus in the reticle plane.

BENJAMIN E. LUBOSHEZ.

REFERENCES CITED

The following references are of record in the file of this patent:

UNITED STATES PATENTS

| Number | Name | Date |
|---|---|---|
| 921,773 | Wild | May 18, 1909 |
| 1,736,682 | Tuckerman | Nov. 19, 1929 |
| 1,854,760 | Paulson | Apr. 19, 1932 |
| 1,918,527 | Eppenstein | July 18, 1933 |
| 2,247,113 | Benford | June 24, 1941 |
| 2,304,814 | Glasser | Dec. 15, 1942 |
| 2,317,988 | Forssberg | May 4, 1943 |
| 2,398,904 | Libman et al. | Apr. 23, 1946 |
| 2,406,798 | Burroughs | Sept. 3, 1946 |

OTHER REFERENCES

"An instrument for the testing of prisms," an article by G. W. Moffitt in the Journal of the Optical Society of America for October 1923. Pages 831 to 838 and 845 to 849 cited.